United States Patent Office 3,436,664
Patented Apr. 1, 1969

3,436,664
DEVICE FOR GRID CONTROL OF
GAS-FILLED RECTIFIERS
Yakov Judelevich Solodukho, ul. Scherbakovskaya 26–30, kv. 5, and Boris Stepanovich Zamaraev, ul. Vostochnaya korpus 2, kv. 106, both of Moscow, U.S.S.R.
Filed Sept. 3, 1965, Ser. No. 484,839
Int. Cl. H03k 3/04, 3/06; H01j 19/82
U.S. Cl. 328—225          3 Claims

ABSTRACT OF THE DISCLOSURE

A device for the grid control of ionic converter rectifiers having at least two semiconductor controlled rectifiers inserted in the grid circuit of the gas-filled rectifiers and a capacitor and a ballast resistor also inserted in the grid circuit of said gas-filled rectifiers and interconnected such that when a positive gate pulse is applied to the grid of a gas-filled rectifier by one of said semiconductor controlled rectifiers, the negative blanking voltage is simultaneously interrupted by the other semiconductor controlled rectifier, and vice versa.

---

The present invention relates to a device for grid control of ionic converter gas-filled rectifiers.

There are devices in use designed for grid control of ionic converter rectifiers and constructed as an inverter employing semiconductor controlled rectifiers and having at least one switching capacitor and one ballast resistor, said capacitor and resistor being inserted in a grid circuit of gas-filled rectifiers.

The above mentioned devices have also a blanking voltage source permanently connected to gas-filled rectifiers. The presence of said blanking voltage source permanently connected to gas-filled rectifiers tends to increase power losses in the device and necessitates to increase the grid voltage pulse amplitude in order to obtain a surplus over the negative blanking voltage, necessary for the rectifier to be cut in.

Though power losses in the above mentioned devices are relatively small, it is nevertheless necessary to minimize them for elimination of heating of semiconductors and, hence, for making the grid control semiconductor system more reliable in operation and simpler in design, this being of particular importance for devices designed to control powerful converters.

An object of the present invention is to provide such a device for grid control of ionic converter rectifiers which would insure relatively small power losses in ballast resistors.

Another object of this invention is to provide a device for grid control of ionic converter rectifiers which would have only one power source for reduction of the power source voltage.

According to the invention these objects are achieved by providing a device in which controlled semiconductor rectifiers, at least one switching capacitor and gas-filled rectifiers are interconnected in such a way that when a positive gate pulse is applied to the grid of a gas-filled rectifier by one controlled semiconductor rectifier, the negative blanking voltage is simultaneously cut off by another controlled semiconductor rectifier, and vice versa.

In order to apply a positive gate pulse to the gas-filled rectifier grid by one controlled semiconductor rectifier with simultaneous cut off of negative blanking voltage by another controlled semiconductor rectifier, there may be inserted switching capacitors between anodes and cathodes of the controlled semiconductor rectifiers through the windings of an isolation transformer.

For application of a positive gate pulse to the gas-filled rectifier grid with simultaneous cut-off of negative blanking voltage it is also expedient to couple the cathode of the gas-filled rectifier to a terminal of a switching capacitor, the other terminal of said capacitor being connected through a grid leak to the grid of said-filled rectifier. This allows only one power source to be used as a source of blanking and trigger voltages.

Figure 1:
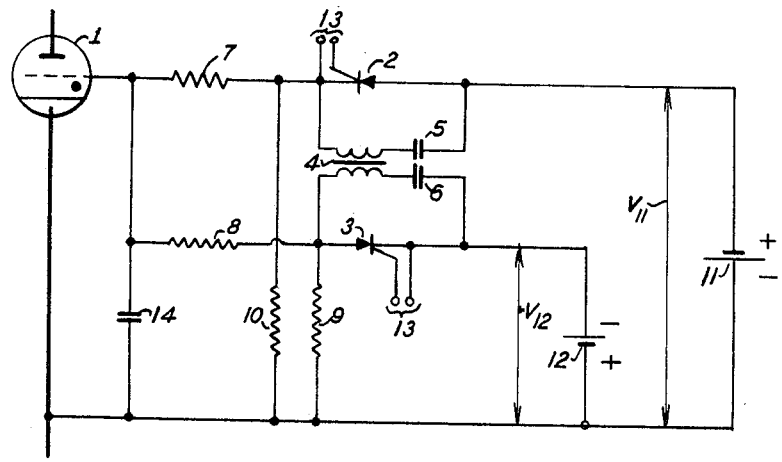
Figure 2:
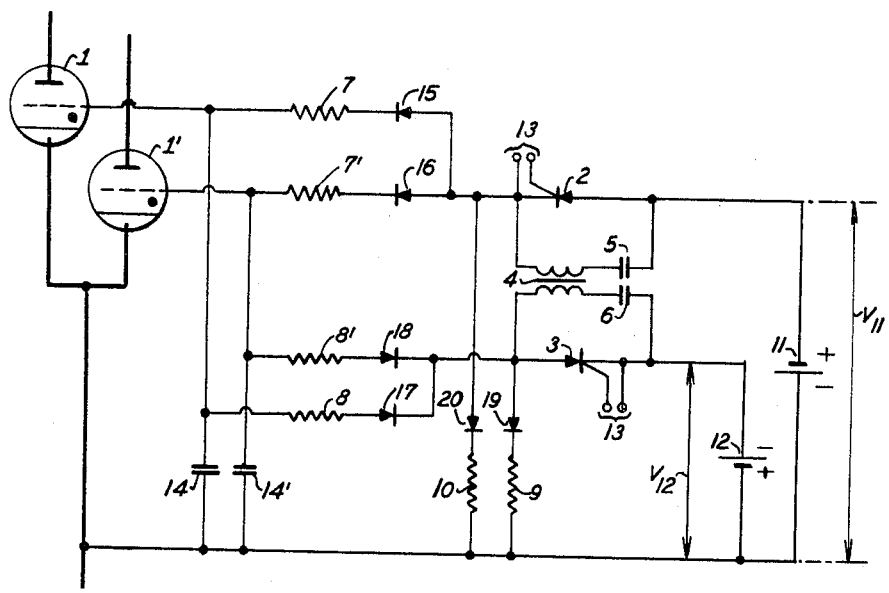
Figure 3:
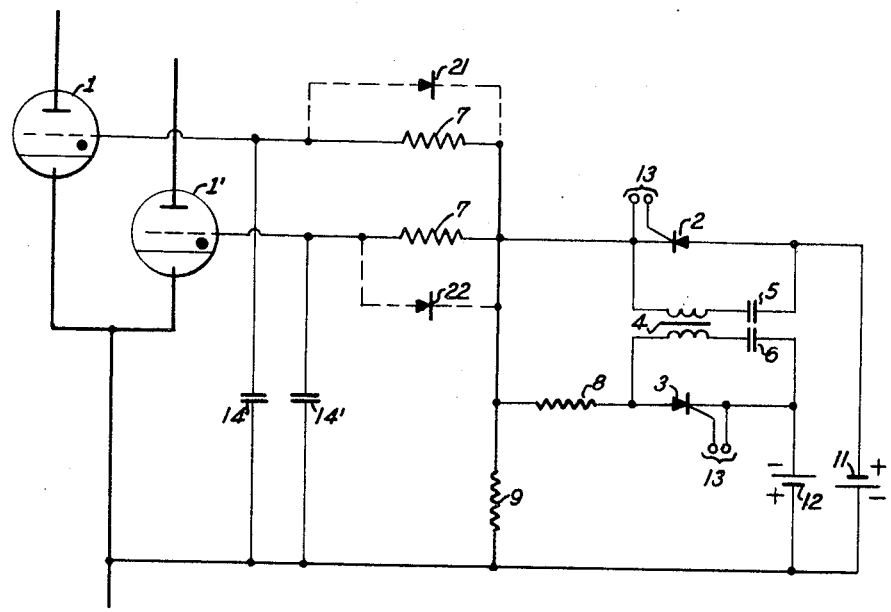
Figure 4:
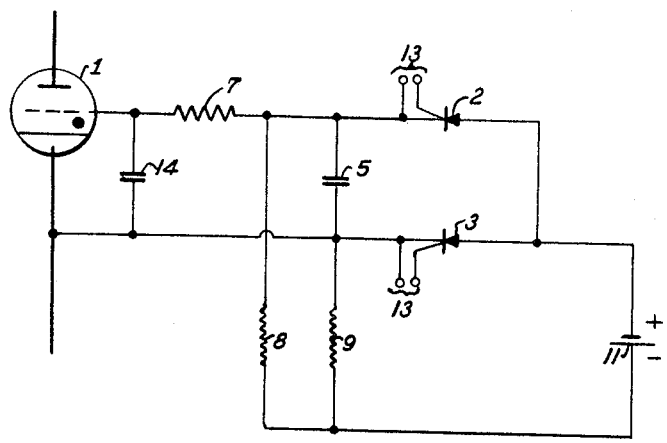

The present invention will be more fully understood upon a consideration of the following description with reference to the accompanying drawings, wherein:

FIG. 1 is a circuit diagram of a device for grid control of one gas-filled rectifier, said device, having separate sources of blanking and trigger voltages;

FIG. 2 is a circuit diagram of a device for grid control of several-filled rectifiers, said device having separate deionization resistors and separate sources of blanking and trigger voltages, and FIG. 3 is a circuit diagram of a device for grid control of several gas-filled rectifiers, said device having a common deinoization resistor and separate sources of blanking and trigger voltages; and FIG. 4 is a circuit diagram of a device for grid control of a gas-filled rectifier, said device having a common source of blanking and tirgger voltages.

Referring now to FIG. 1, the device for grid control of a gas-filled rectifier 1 employs an inverter circuit and comprises: controlled semiconductor rectifiers 2 and 3 referred to hereinbelow as controlled rectifiers, an isolation transformer 4, switching capacitors 5 and 6, a grid leak 7, a deionization resistor 8, ballast resistors 9 and 10, a trigger voltage source 11 and a blanking voltage source 12.

Said switching capacitors 5 and 6 are inserted between anodes and cathodes of the controlled rectifiers 2, 3 through the windings of said isolation transformer 4, which allows lesser power losses in the ballast resistors 9, 10.

The controlled rectifiers 2 and 3 are intended for alternately coupling the trigger voltage source 11 and blanking voltage source 12 through the grid leak 7 and deionization resistor 8, respectively, to the grid of the gas-filled rectifier 1.

For application of a positive gate pulse to the grid of the gas-filled rectifier 1 the controlled rectifier 2 is rendered conductive by supplying a voltage pulse from a phase control circuit 13. The capacitor 5 preliminarily charged to the voltage equal to the sum of voltages of the sources 11 and 12 ($V_{11}+V_{12}$) discharges through the rectifier 2 onto a winding of the isolation transformer 4. During this discharge in the other winding of the transformer 4 there appears voltage which is applied through the noncharged capacitor 6 (since the controlled rectifier 3 was conductive) to the controlled rectifier 3, thereby inducing in it a negative anode voltage and allowing the controlled rectifier 3 to be cut off.

When the grid current whose value is determined by voltage $V_{11}$ and the value of the grid leak 7, the capacitor 6 is charged to voltage $V_{12}$, thus preparing the quenching circuit of the rectifier 2.

For application of negative blanking voltage to the grid of the gas-filled rectifier 1 the controlled rectifier 3 is rendered conductive and the capacitor 6 discharges through said rectifier onto a winding of the isolation transformer 4. During this discharge in the other winding of the transformer 4 there appears voltage which is applied through the noncharged capacitor 5 to the controlled rectifier 2, thereby also inducing in it negative anode voltage, which allows the controlled rectifier 2 to be cut off. The value of the deionization current which passes from the trigger voltage source 12 through the deionization resistor 8 is determined by the value of said resistor and voltage $V_{12}$.

On completion of deionization the cathode-grid voltage of the gas-filled rectifier 1 becomes equal to $V_{12}$. The ballast resistor 9 provides for the conductive state of the controlled rectifier 3 after deionization current of the gas-filled rectifier 1 stops flowing and the resistor 10 allows obtaining grid pulses with the gas-filled rectifier not excited, which is necessary for phasing. The values of the capacitors 5 and 6 and the number of turns of the transformer 4 are chosen so as to obtain short pulses across the transformer 4.

The grid capacitor 14 placed between the grid and cathode of the gas-filled rectifier 1 serves for elimination of disturbances.

In the device for grid control of several gas-filled rectifiers, for example rectifiers 1 and 1' (FIG. 2), decoupling diodes 15, 16, 17, 18, 19 and 20 are inserted in the circuits of said rectifiers to prevent voltage drop at the gas-filled rectifier grid, said voltage drop occurring due to the influence of the ballast resistors 9 and 10 and because of the fact that grid current does not start flowing and deionization current is not switched off simultaneously in all said circuits.

If there were no arc between the grid and the cathode of the gas-filled rectifier 1 (with positive voltage across said grid) a current would flow, in case of absence of the diode 19, through the controlled rectifier 2, resistors 7, 8 and 9, and grid voltage of the gas-filled rectifier 1 would become lesser than $V_{11}$. For the purpose the device (FIG. 2) is provided with separate grid leaks 7 and 7', deionization resistors 8 and 8' and grid capacitors 14 and 14'.

The deionization resistor 8 may be common for the gas-filled rectifiers 1 and 1' (FIG. 3). In this case the grid leaks 7 and 7' do not belong to the switching circuit of the controlled semiconductor rectifiers 2 and 3, which allows increasing the slope of a grid gate pulse. This slope depends solely on the ON-period of the controlled rectifier 2 and is not associated with switching processes. For reduction of the total resistance of the deionization circuit there may be employed grid diodes 21 and 22 which shunt the grid leaks 7 and 7' as long as deionization currents flow.

The cathode of the gas-filled rectifier 1 may be connected directly to a terminal of the switching capacitor 5 (FIG. 4), the other terminal of said capacitor being connected through the grid leak 7 to the grid of the gas-filled rectifier 1. In this case when the controlled rectifier 2 is conductive a positive potential is applied to the grid of the gas-filled rectifier 2 with respect to the cathode of the latter, and when the rectifier 3 is conductive a negative potential is applied thereto. By alternatively making the rectifiers 2 and 3 conductive with the help of the phase control circuit 13 alternation of positive gate pulses and negative blanking pulses may be obtained on the grid of the gas-filled rectifier 1. Extinction of the controlled rectifiers 2 and 3 is effected by the switching capacitor 5. In this embodiment of the invention there is only one power source 11 which serves as a source of trigger and blanking voltages. This allows reduction of the power supply source voltage by approximately 50% and use of controlled semiconductor rectifiers at lower rated voltage.

Depending upon the character of the control pulses 13 sent to the controlled semiconductor rectifiers 2 and 3, the latter are in turn opened and thus rendered conductive: when the controlled semiconductor rectifier 2 is conductive, the controlled semiconductor rectifier 3 is non-conductive (closed); and when the controlled semiconductor rectifier 3 is conductive, the controlled semiconductor rectifier 2 is closed. With the controlled semiconductor rectifier 2 conductive, the positive terminal of the source 11 is connected through the resistor 7 to the grid of the gas-filled rectifier 1, and through the resistor 8 to the negative terminal of the source 11. The capacitor 5 is charged in such a manner that its upper plate becomes positive, and its lower plate negative. The cathode of the gas-filled rectifier 1 is connected to the negative pole of the source 11 through the resistor 9. Thus, relative to the cathode of the gas-filled rectifier 1, the grid of the gas-filled rectifier 1 is supplied with positive voltage.

With the controlled semiconductor 3 opened, the negative plate of the capacitor 5 is connected through the controlled semiconductor rectifier 3 to the anode of the controlled semiconductor rectifier 2.

Under the action of the capacitor 5 charge, the controlled semiconductor rectifier 2 becomes closed, and the controlled semiconductor rectifier 3 remains opened. The positive terminal of the source 11 is connected to the cathode of the gas-filled rectifier 1 through the controlled semiconductor rectifier 3, whereas the negative terminal of the source 11 is connected to the grid of the gas-filled rectifier 1 through the resistors 8 and 7. The capacitor 5 is recharged to the opposite polarity and thus is prepared to close the controlled semiconductor rectifier 3. Thus, relative to the cathode of the gas-filled rectifier 1, the grid of the gas-filled rectifier 1 is supplied with negative voltage.

The aforedescribed cycle is repeated with the frequency of the voltage supplying the gas-filled rectifier 1 and with an alternating phase determined by the pulses of the control circuit 13. It is apparent that the control pulses for the controlled semiconductor rectifiers 2 and 3 should be sufficiently narrow and should not overlap in time in order not to disturb the operation of the inverter.

The time interval between the control pulse 13 for the controlled semiconductor rectifier 3 and the control pulse 13 for the controlled semiconductor rectifier 2 determines the length of the time during which the grid of the gas-filled rectifier 1 is supplied with positive opening voltage. During the rest of the cycle the grid of the gas-filled rectifier 1 is supplied with closing negative voltage.

Though the present invention is described with reference to the preferred embodiments thereof, it is nevertheless obvious that various changes and variations may take place without departing from the nature and scope of the invention, which will be readily understood by those skilled in the art.

We claim:

1. A device for grid control of ionic converter rectifiers comprising: two semiconductor controlled rectifiers inserted in the grid circuit of the gas-filled rectifiers; two switching capacitors, one of said capacitors being inserted between the anode and cathode of one of said semiconductor controlled rectifiers through a winding of an isolation transformer and the other capacitor being also inserted between the anode and cathode of the other semiconductor controlled rectifier through the other winding of said isolation transformer; at least one ballast resistor inserted in the grid circuit of gas-filled rectifiers; a trigger voltage source for application of a positive pulse through grid leaks to the grid of a gas-filled rectifier via one of said semiconductor controlled rectifiers; a blanking voltage source for application of a negative pulse to the grid of said gas-filled rectifiers through the other semiconductor controlled rectifiers; a negative blanking voltage being simultaneously cut off by one of said semiconductor controlled rectifiers when a positive gate pulse is applied to the grid of a gas-filled rectifier by the other semiconductor controlled rectifier, and vica versa.

2. A device for grid control of a gas-filled rectifier comprising at least one source of voltage for opening the rectifier and for supplying closing voltage to said rectifier; first and second controlled semi-conductor rectifiers, said first controlled semiconductor rectifier being operative to connect said source of voltage to the grid circuit of said gas-filled rectifier, thus providing for positive opening voltage in the grid of said gas-filled rectifier while simultaneously discontinuing closing of the grid of said voltage source by cutting off said second controlled semiconductor rectifier, said second semiconductor rectifier being operative to connect said source of voltage to said grid circuit, thus providing for negative closing voltage in said grid while simultaneously discontinuing opening of said grid of said source of voltage by cutting off said first rectifier; at least one switching capacitor providing quenching of the preliminarily cut-in first or second rectifier; and at least one ballast resistor inserted in the grid circuit of said gas-filled rectifier.

3. A device as claimed in claim 2, wherein said voltage source is a single source of voltage both for opening and closing said gas-filled rectifier; said two controlled semiconductor rectifiers being connected by one pair of their terminals of the power circuit to one pole of said source and by the other pair of terminals of the power circuit to the opposite pole of said source via said ballast resistor; said switching capacitor being connected to the second pair of terminals of the power circuit of said rectifiers and by one pole to one of the poles of the grid circuit of said gas-filled rectifier; and a grid resistor connected to the opposite pole of said capacitor and to the opposite pole of the grid circuit of said gas-filled rectifier.

References Cited

UNITED STATES PATENTS

| | | | |
|---|---|---|---|
| 2,020,930 | 11/1935 | Berthold et al. | 328—225 |
| 2,293,135 | 8/1942 | Hallmark | 328—225 |
| 2,467,765 | 4/1949 | Mayle | 315—199 |
| 2,812,474 | 11/1957 | Henle | 307—88.5 |
| 3,120,634 | 2/1964 | Genuit | 307—88.5 |
| 3,222,540 | 12/1965 | De Reynold | 328—210 |
| 3,249,805 | 5/1966 | McCabe | 315—19.4 |

FOREIGN PATENTS

| | | |
|---|---|---|
| 640,354 | 1962 | Canada. |

ARTHUR GAUSS, *Primary Examiner.*

HAROLD DIXON, *Assistant Examiner.*

U.S. Cl. X.R.

307—241, 252; 328—198